United States Patent
Yamaya et al.

(10) Patent No.: US 6,846,568 B2
(45) Date of Patent: Jan. 25, 2005

(54) ANTIREFLECTIVE, MAR-RESISTANT MULTILAYER LAMINATE

(75) Inventors: Masaaki Yamaya, Gunma-ken (JP); Kazuharu Sato, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 113 days.

(21) Appl. No.: 10/195,434

(22) Filed: Jul. 16, 2002

(65) Prior Publication Data

US 2003/0087102 A1 May 8, 2003

(30) Foreign Application Priority Data

Jul. 16, 2001 (JP) ........................................ 2001-215292

(51) Int. Cl.⁷ .......................... B32B 25/20; B32B 27/08
(52) U.S. Cl. ........................ 428/447; 428/336; 428/429; 428/500; 428/522; 428/689; 428/702
(58) Field of Search .............................. 428/336, 429, 428/447, 689, 500, 522, 702

(56) References Cited

U.S. PATENT DOCUMENTS

| | | | | |
|---|---|---|---|---|
| 4,439,494 A | * | 3/1984 | Olson | 428/412 |
| 5,181,141 A | * | 1/1993 | Sato et al. | 359/580 |
| 5,783,299 A | * | 7/1998 | Miyashita et al. | 428/329 |
| 5,874,801 A | | 2/1999 | Kobayashi et al. | |
| 6,129,980 A | * | 10/2000 | Tsukada et al. | 428/327 |
| 6,166,855 A | * | 12/2000 | Ikeyama et al. | 359/580 |
| 6,572,973 B1 | * | 6/2003 | Taruishi et al. | 428/447 |
| 2001/0035929 A1 | * | 11/2001 | Nakamura et al. | 349/137 |
| 2002/0018886 A1 | * | 2/2002 | Matsufuji et al. | 428/328 |
| 2002/0039651 A1 | * | 4/2002 | Murata | 428/354 |
| 2003/0082399 A1 | * | 5/2003 | He et al. | 428/689 |

FOREIGN PATENT DOCUMENTS

| | | |
|---|---|---|
| EP | 0 778 476 A2 | 6/1997 |
| EP | 1 022 587 A1 | 7/2000 |
| JP | 63-21601 A | 1/1988 |
| JP | 2-19801 A | 1/1990 |
| JP | 9-96702 A | 4/1997 |
| JP | 9-226062 A | 9/1997 |
| JP | 9-288202 A | 11/1997 |
| JP | 10-147740 A | 6/1998 |
| JP | 2000-117902 A | 4/2000 |
| JP | 2000-171604 A | 6/2000 |
| JP | 2000-198964 A | 7/2000 |

* cited by examiner

*Primary Examiner*—Jeffrey B. Robertson
(74) *Attorney, Agent, or Firm*—Birch, Stewart, Kolasch & Birch LLP

(57) ABSTRACT

A multilayer laminate is composed of a transparent substrate such as glass, ceramic or plastic on which are applied, in order, a protective layer, a high refractive index layer with a refractive index of at least 1.60, and a low refractive index layer with a refractive index of not more than 1.45, each having a specific resin-based composition. The resulting films, when cured, have an excellent adhesion to the substrate and exhibit outstanding mar resistance and antireflective properties.

13 Claims, No Drawings

ANTIREFLECTIVE, MAR-RESISTANT MULTILAYER LAMINATE

BACKGROUND OF THE INVENTION

1. Field of the Invention

The present invention relates to a multilayer laminate endowed with excellent antireflective properties and mar resistance which is obtained by laminating onto a transparent substrate, in order: a protective layer, a high refractive index layer, and a low refractive index layer.

2. Prior Art

Displays for electronic equipment such as personal computers, word processors, televisions and plasma displays make use of glass or, when a lighter weight material is called for, transparent plastic. During the observation and recognition of visual information such as writing, graphics and objects through such a transparent substrate, visual information at the interior is often difficult to see because of outside light reflected by the surface of the substrate.

One method used to prevent reflection by such a transparent substrate is to provide a single low refractive index layer on the surface of the transparent substrate, which is typically a sheet of glass or a plastic substrate (e.g., plastic lens, plastic film, plastic sheet). Unfortunately, the difference in refractive index achieved in this way is too small to provide a satisfactory antireflective effect. Such a low refractive index layer can be formed by vapor-depositing an inorganic metal oxide. This process provides a good coat, but the equipment needed to carry it out is very expensive to install and the process itself imposes limitations on the size of the substrate. A need has thus been felt for a liquid coating-based treatment that is relatively free of such impediments.

Various coatings developed to avoid the drawbacks of a vapor deposition process have had mixed success. For example, methods that involve coating a fluoropolymer-containing solution (JP-A 2-19801, JP-A 10-147740) resolve the problems associated with vapor deposition, but the poor adhesion of such fluoropolymers to the substrate and the inadequate hardness of the cured film have resulted in a poor resistance to marring.

JP-A 63-21601 describes a method for coating the hydrolyzate of a perfluoroalkylsilane compound, but uniform hydrolysis and a coat of uniform transparency are difficult or impossible to achieve using long-chain fluorosilanes. Moreover, use of the short-chain trifluoropropylsilane mentioned in the examples given in the specification fails to lower the refractive index to a sufficient degree. Hence, both the antireflective properties and the mar resistance are inadequate.

JP-A 2000-171604 describes a method in which an alkylsilane compound is cured with a photoacid generator, but here too the antireflective properties are inadequate. Hence, all of the above prior-art methods fail to achieve a sufficient antireflective effect using a low refractive index layer alone, and also fail to provide adequate mar resistance.

A number of attempts have been made to improve the antireflective properties by laminating a high refractive index layer and a low refractive index layer onto a transparent substrate. For example, JP-A 9-288202 describes an antireflection system composed of a high refractive index layer containing a metal alkoxide and a colloidal metal oxide in combination with a noncrystalline fluorocarbon resin-based low refractive index layer. Although this system achieves an acceptable degree of antireflective effects, the low refractive index layer does not adhere well to the high refractive index layer and has insufficient surface hardness, resulting in a poor mar resistance.

JP-A 9-226062 discloses a system which vacuum evaporates a low refractive index layer composed of $SiO_2$ onto a high refractive index layer composed of a reactive organosilicon compound-containing ionizing radiation-curable resin and fine particles having a high refractive index. However, this system requires the use of a vapor deposition apparatus and thus entails excessive costs. JP-A 2000-117902 describes a system in which the low refractive index layer is composed instead of the hydrolyzate of a long-chain fluorosilane, but this has an inadequate mar resistance. In another system, described in JP-A 2000-198964, the hydrolyzate of a hydrolyzable silane serves as the low refractive index layer. However, the layer does not have a sufficiently low refractive index. Moreover, neither the antireflective effects nor the mar resistance are adequate. Given the principles involved in preventing reflection, a good antireflective effect generally requires that the film thickness of the high refractive index layer and the low refractive index layer be controlled to about ¼ λ (where λ is the wavelength of the incident light), and thus substantially to about 0.1 μm. Yet, films with a thickness of this order have inherent limitations in that they cannot withstand marring forces and thus tend to become marred.

To further improve mar resistance, methods have been proposed for successively laminating a hard protective coat, a high refractive index layer and a low refractive index layer. In one such process, disclosed in JP-A 9-96702, a high refractive index layer composed primarily of a metal alkoxide is formed on a hard coat composed primarily of an acrylic resin or an organosilicon compound in combination with a colloidal oxide, and a low refractive index layer composed primarily of an organosilicon compound and a colloidal oxide is formed on the high refractive index layer. This arrangement provides a substantially improved mar resistance, but the high refractive index layer is still not hard enough. In addition, the low refractive index layer does not have a low enough refractive index, as a result of which the antireflective properties also are inadequate.

Hence, a transparent substrate coating process which provides both good antireflective properties and mar resistance has not previously been found.

SUMMARY OF THE INVENTION

It is therefore an object of the invention to provide a multilayer laminate which has excellent adhesion to various substrates, provides outstanding mar resistance and antireflective properties, and is endowed also with good transparency.

After extensive research to develop a coating process that confers both excellent mar resistance and excellent antireflective properties, we have found that multilayer laminates produced by the successive lamination onto a transparent substrate of a protective layer, a high refractive index layer and a low refractive index layer, each having a specific composition, are singularly effective for achieving the desired aims.

To ensure excellent antireflective properties, it is desirable for the high refractive index layer to have as high a refractive index as possible and for the low refractive index layer to have as low a refractive index as possible. As one would expect, an excellent mar resistance requires that each layer have a high hardness. However, the adhesion between each layer is also very important for achieving this end. We have discovered that good antireflective properties and good mar resistance can both be achieved by judiciously combining materials which satisfy all of the above conditions.

Specifically, knowing that it is desirable for the protective layer serving as the bottommost layer to have an excellent adhesion to the substrate, at least a certain minimum thickness and a good hardness, we have found that it is effective for this protective layer to be made of a (meth)acryl functional substituent-bearing compound, a curable composition in cured form which contains such a compound, or a thermoplastic acrylic resin.

Moreover, a layer having a high hardness and as high a refractive index as possible has been desired as the high refractive index layer situated at the center of the multilayer laminate. We have discovered that a high refractive index metal oxide sol should be present in the high refractive index layer, and that the use of a titanium-containing metal oxide sol is particularly advantageous because it enables a higher refractive index to be achieved and allows the hardness to be increased at the same time.

Similarly, a layer having a high hardness and as low a refractive index as possible has been sought as the low refractive index layer serving as the uppermost layer. Our investigations have shown that fluorine-containing silicone resins are suitable as low refractive index layer materials which satisfy the above conditions. The following are especially preferred:

(i) silicone resins prepared by hydrolyzing a mixture of a perfluoroalkylsilane, trifluoropropylsilane and $SiX_4$ (wherein X is a hydrolyzable group);

(ii) silicone resins prepared by hydrolyzing a mixture of a perfluoroalkylsilane with a functional group-bearing silane compound.

We have also discovered that providing a protective layer having a thickness of at least 1 μm and successively laminating thereon the other layers to a predetermined optical film thickness ensures that both excellent antireflective properties and outstanding mar resistance are achieved at the same time.

Because this construction exhibits excellent adhesion to various substrates, achieves the combination of excellent mar resistance and antireflective properties that has been so difficult to attain in the prior art, and provides a multilayer laminate of excellent transparency, such multilayer laminates are highly suitable for use as antireflective optical products or films endowed with excellent water repellence, stain-proofing properties, ability to prevent fingerprinting, and mar resistance. Examples of such applications include various types of displays (e.g., computer displays, televisions, plasma displays), polarizers for liquid-crystal displays, transparent plastic lens, covers for various types of instruments, and window glass for automobiles and trains.

Accordingly, the invention provides an antireflective, mar-resistant multilayer laminate which includes a transparent substrate and, successively laminated thereon:

(1) a protective layer composed of a (meth)acryl functional substituent-bearing compound, a curable composition in cured form which contains the compound, or a thermoplastic acrylic resin;

(2) a high refractive index layer which contains a metal oxide sol and has a refractive index of at least 1.60; and (3) a low refractive index layer having a refractive index of at most 1.45 which is prepared by curing a fluorinated organic group-bearing silicone resin-containing composition.

DETAILED DESCRIPTION OF THE INVENTION

As noted above, the multilayer laminate of the invention is produced by the successive lamination, on a transparent substrate, of a protective layer, a high refractive index layer, and a low refractive index layer.

First the protective layer is described. In cases where the protective layer has an excellent adhesion to various types of transparent substrates (e.g., polycarbonate resin, polyalkylene terephthalate resins such as polyethylene terephthalate, cellulose resins such as cellulose triacetate, and glass) and has at least a certain minimum thickness, it must have a good hardness. The protective layer is made of a (meth)acryl functional substituent-bearing compound, a curable composition in cured form which contains such a compound, or a thermoplastic acrylic resin. Specific examples of layers that may be used as the protective layer include:

(A) a layer prepared by subjecting a radiation-polymerizable composition, and in particular a (meth)acryl functional group-bearing organosilicon compound-containing composition, to radiation polymerization so as to effect curing;

(B) a layer composed of an acrylic polymer-containing composition, and especially a hydrolyzable silyl group-bearing acrylic polymer-containing composition, in cured form; and (C) a layer composed of a thermoplastic acrylic resin, and in particular a thermoplastic acrylic resin in which methyl methacrylate serves as a major copolymerizing ingredient and which has an excellent heat resistance and a high hardness.

The radiation-polymerizable composition (A) preferably includes a (meth)acryl functional group-bearing organosilicon compound prepared by hydrolyzing:

(a) a (meth)acryl functional group-bearing organosilicon compound of general formula (1) below

$$A\text{-}SiR''_aX_{3-a} \tag{1}$$

wherein A is a (meth)acryl functional substituent-bearing $C_{3\text{-}10}$ organic group, R" is a $C_{1\text{-}6}$ monovalent hydrocarbon group, X is a hydrolyzable group, and the letter a is an integer from 0 to 2; and (b) a hydrolyzable organosilicon compound of general formula (2) below

$$R'_pSiR''_qX_{4-p-q} \tag{2}$$

wherein R' is a (meth)acryl functional substituent-lacking $C_{1\text{-}8}$ organic group, R" and X are as defined above, and the letters p and q are integers from 0 to 3 such that the sum p+q is 0 to 3.

A is a (meth)acryl functional substituent-bearing $C_{3\text{-}10}$ organic group, illustrative examples of which include γ-methacryloxypropyl, γ-acryloxypropyl, γ-methacryloxymethyl, γ-acryloxymethyl, γ-methacryloxyhexyl, γ-acryloxyhexyl, γ-methacryloxyisobutyl and γ-acryloxyisobutyl.

R' is a (meth)acryl functional substituent-lacking $C_{1\text{-}8}$ organic group, and especially a substituted or unsubstituted monovalent hydrocarbon group. Illustrative examples include alkyls such as methyl, ethyl, propyl, butyl, hexyl, cyclohexyl and 1,1,2-trimethylpropyl; aryls such as phenyl and tolyl; alkenyls such as vinyl; as well as any of these monovalent hydrocarbon groups substituted with a functional group such as epoxy, amino, mercapto, chloro or cyano. Specific examples of the latter include γ-chloropropyl, γ-glycidoxypropyl, β-3,4-epoxycyclohexyl, γ-aminopropyl, γ-mercaptopropyl, N-(β-aminoethyl)-γ-aminopropyl and β-cyanoethyl.

R" is a $C_{1\text{-}6}$ monovalent hydrocarbon group, illustrative examples of which include alkyls such as methyl, ethyl, propyl, butyl, hexyl, cyclohexyl and 1,1,2-trimethylpropyl; and aryls such as phenyl.

X is a hydrolyzable group, suitable examples of which include chloro; $C_{1-8}$ alkoxy groups such as methoxy, ethoxy, propoxy, butoxy, phenoxy, isopropenoxy and methoxyethoxy; $C_{2-8}$ acyloxy groups such as acetoxy; and $C_{4-6}$ oxime groups such as butanoxime.

Specific examples of above compound (a) thus include γ-methacryloxypropyltrichlorosilane, γ-acryloxypropyltrichlorosilane, γ-methacryloxypropyltrimethoxysilane, γ-acryloxypropyltrimethoxysilane, γ-methacryloxypropyltriethoxysilane, γ-acryloxypropyltriethoxysilane, γ-methacryloxypropylmethyldimethoxysilane, γ-acryloxypropylmethyldimethoxysilane, methacryloxymethyltrimethoxysilane, acryloxymethyltrimethoxysilane, methacryloxymethyltriethoxysilane and acryloxymethylmethyldimethoxysilane. Of these, γ-methacryloxypropyltrimethoxysilane, γ-acryloxypropyltriethoxysilane, γ-methacryloxypropylmethyldimethoxysilane and γ-acryloxypropylmethyldimethoxysilane are especially preferred.

Specific examples of above compound (b) include trialkoxysilanes and triacyloxysilanes such as methyltrimethoxysilane, methyltriethoxysilane, methyltris(2-methoxyethoxy)silane, methyltriacetoxysilane, methyltripropoxysilane, methyltriisopropenoxysilane, methyltributoxysilane, ethyltrimethoxysilane, ethyltriethoxysilane, vinyltrimethoxysilane, vinyltriethoxysilane, vinyltriacetoxysilane, vinyltris(2-methoxyethoxy)silane, vinyltriisopropenoxysilane, phenyltrimethoxysilane, phenyltriethoxysilane, phenyltriacetoxysilane, γ-chloropropyltrimethoxysilane, γ-chloropropyltriethoxysilane, γ-chloropropyltripropoxysilane, γ-glycidoxypropyltrimethoxysilane, γ-glycidoxypropylmethyldimethoxysilane, γ-glycidoxypropyltriethoxysilane, γ-glycidoxypropylmethyldiethoxysilane, β-(3,4-epoxycyclohexyl)ethyltrimethoxysilane, β-(3,4-epoxycyclohexyl)ethylmethyldimethoxysilane, β-(3,4-epoxycyclohexyl)ethyltriethoxysilane, β-(3,4-epoxycyclohexyl)ethylmethyldiethoxysilane, γ-aminopropyltrimethoxysilane, γ-aminopropyltriethoxysilane, γ-mercaptopropyltrimethoxysilane, γ-mercaptopropyltriethoxysilane, N-(β-aminoethyl)-γ-aminopropyltrimethoxysilane and β-cyanoethyltrimethoxysilane; dialkoxysilanes and diacyloxysilanes such as dimethyldimethoxysilane, dimethyldiethoxysilane, dimethyldi(2-methoxyethoxy)silane, dimethyldiacetoxysilane, dimethyldipropoxysilane, dimethyldiisopropenoxysilane, dimethyldibutoxysilane, vinylmethyldimethoxysilane, vinylmethyldiethoxysilane, vinylmethyldiacetoxysilane, vinylmethyldi(2-methoxyethoxy)silane, vinylmethyldiisopropenoxysilane, phenylmethyldimethoxysilane, phenylmethyldiethoxysilane, phenylmethyldiacetoxysilane, γ-propylmethyldimethoxysilane, γ-propylmethyldiethoxysilane, γ-propylmethyldipropoxysilane, γ-aminopropylmethyldimethoxysilane, γ-aminopropylmethyldiethoxysilane, γ-mercaptopropylmethyldimethoxysilane, γ-mercaptopropylmethyldiethoxysilane, N-(β-aminoethyl)-γ-aminopropylmethyldimethoxysilane and β-cyanoethylmethyldimethoxysilane; and tetraalkoxysilanes such as methyl silicate, ethyl silicate, n-propyl silicate, n-butyl silicate, sec-butyl silicate and t-butyl silicate.

Compounds (a) and (b) are used in relative proportions such that the mixing ratio a/(a+b) is in a range of preferably 0.01 to 0.9. Below this range, the composition tends to have a poor radiation curability, whereas above this range, the crosslink density becomes high, which may lead to cracking of the applied coat. A ratio within a range of 0.05 to 0.8 is especially preferred.

When a mixture of (a) and (b) is employed as the hydrolyzate thereof, the amount of water used in hydrolysis is preferably such that the molar ratio $H_2O/Si$—X is from 0.1 to 10. That is, the hydrolyzate or hydrolyzate/condensate used may range from an alkoxy-terminal oligomer to a silanol group-terminal silicone resin.

Hydrolysis may be carried out by a method known to the art. Illustrative examples of condensation reaction promoters (catalysts) that may be used for this purpose include acids such as hydrochloric acid, acetic acid and maleic acid; bases such as NaOH, ammonia, amine compounds (e.g., triethylamine, dibutylamine, hexylamine, octylamine) and salts of amine compounds, and quaternary ammonium salts (e.g., benzyltriethylammonium chloride, tetramethylammonium hydroxide); fluorides such as potassium fluoride and sodium fluoride; solid acidic catalysts and solid basic catalysts (e.g., ion-exchange resin catalysts); the metal salts of organic carboxylic acids, such as iron 2-ethylhexoate, titanium naphthenate, zinc stearate and dibutyltin diacetate; organometallic compounds such as tetrabutoxytitanium, tetra-i-propoxytitanium, organotitanium esters (e.g., dibutoxy(bis-2,4-pentanedionate)titanium, di-i-propoxy(bis-2,4-pentanedionate)titanium), tetrabutoxyzirconium, tetra-i-propoxyzirconium, organozirconium esters (e.g., dibutoxy(bis-2,4-pentanedionato)zirconium, di-i-propoxy(bis-2,4-pentanedionato)zirconium), alkoxyaluminum compounds (e.g., aluminum triisopropoxide) and aluminum chelate compounds (e.g., aluminum acetylacetonate complex); and aminoalkyl-substituted alkoxysilanes such as γ-aminopropyltrimethoxysilane, γ-aminopropyltriethoxysilane, N-(β-aminoethyl)-γ-aminopropyltrimethoxysilane and N-(β-aminoethyl)-γ-aminopropyltriethoxysilane. Any one or mixtures thereof may be used as the catalyst.

The above catalyst is used in an amount of preferably 0.01 to 10 parts by weight, and most preferably 0.1 to 1 part by weight, per 100 parts by weight of the combined amount of organosilicon compounds (a) and (b). At less than 0.01 part by weight, the reaction generally takes too much time to reach completion, or may even fail to proceed altogether. On the other hand, the use of more than 10 parts by weight of catalyst entails excessive cost, in addition to which it may result in discoloration of the resulting composition and increase the number of side reactions.

To achieve the desired properties in the multilayer laminate such as hardness, adhesion to the substrate and mar resistance, or to adjust the viscosity, curability and other properties of the composition, the organosilicon compounds prepared by such hydrolysis may also have an acryloyl group or methacryloyl group-bearing compound (hereinafter referred to collectively as "(meth)acrylate compounds") added thereto. Specific examples of suitable (meth)acrylate compounds include monofunctional (meth)acrylates such as (meth)acrylates of ethylene oxide-modified phenols, (meth)acrylates of propylene oxide-modified phenols, (meth)acrylates of ethylene oxide-modified nonylphenols, (meth)acrylates of propylene oxide-modified nonylphenols, 2-ethylhexylcarbitol (meth)acrylates, isobornyl (meth)acrylates, tetrahydrofurfuryl (meth)acrylates, hydroxyethyl (meth)acrylates, hydroxypropyl (meth)acrylates, hydroxybutyl (meth)acrylates, hydroxyhexyl (meth)acrylates, diethylene glycol mono(meth)acrylates, dipropylene glycol mono(meth)acrylates, triethylene glycol mono(meth)acrylates, tripropylene glycol mono(meth)acrylates, methyl (meth)

acrylates, butyl (meth)acrylates, 2-ethylhexyl (meth) acrylates, acrylonitrile and glycidyl (meth)acrylates; (meth) acrylic acids such as methacrylic acid and acrylic acid; polyfunctional (meth)acrylates such as diethylene glycol di(meth)acrylate, triethylene glycol di(meth)acrylate, tetraethylene glycol di(meth)acrylate, dipropylene glycol di(meth)acrylate, tripropylene glycol di(meth)acrylate, tetrapropylene glycol di(meth)acrylate, polypropylene glycol di(meth)acrylate, 1,4-butanediol di(meth)acrylate, neopentyl glycol di(meth)acrylate, di(meth)acrylates of ethylene oxide-modified neopentyl glycols, di(meth)acrylates of ethylene oxide-modified bisphenol A, di(meth)acrylates of propylene oxide-modified bisphenol A, di(meth)acrylates of ethylene oxide-modified hydrogenated bisphenol A, trimethylolpropane di(meth)acrylate, trimethylolpropane allyl ether di(meth)acrylate, trimethylolpropane tri(meth) acrylate, ethylene oxide-modified trimethylolpropane tri (meth)acrylate, propylene oxide-modified trimethylolpropane tri(meth)acrylate, pentaerythritol tri(meth)acrylate, pentaerythritol tetra(meth)acrylate and dipentaerythritol hexaacrylate; polyester acrylates such as Aronix M-6400 (a polyester acrylate produced by Toagosei Co., Ltd.); urethane acrylates such as Aronix M-1200 (a urethane acrylate produced by Toagosei Co., Ltd.), the compounds 2,2,6,6-tetramethyl-4-piperidinyl methacrylate and 1,2,2,6,6-pentamethyl-4-piperidinyl methacrylate which have a cyclic hindered amine structure, and the benzotriazole ring-bearing compound 2-(2'-hydroxy-5'-methacryloxyethylphenyl)-2H-benzotriazole.

The amount in which such (meth)acrylate compounds are included is not subject to any particular limitation, although it is desirable to include 0 to 1,000 parts by weight, and especially 5 to 300 parts by weight, of (meth)acrylate compound per 100 parts by weight of the (meth)acryl functional group-bearing organosilicon compound.

To achieve the desired properties in the applied film, such as hardness, mar resistance and electrical conductivity, it is desirable to include also fine particles of an inorganic oxide (e.g., silica, aluminum oxide, titanium oxide, zinc oxide, zirconium oxide, cerium oxide, tin oxide, indium oxide, or a complex oxide thereof). Colloidal silica is especially desirable for this purpose. Suitable fine inorganic oxide particles have an average particle size of preferably 0.001 to 0.1 $\mu$m, and most preferably 0.001 to 0.05 $\mu$m. At an average particle size larger than 0.1 $\mu$m, the clarity of the cured film that forms may decline depending on the composition prepared. If desired, these fine inorganic oxide particles may be surface-treated with an organometallic compound such as a silane, titanium, aluminum or zirconium coupling agent.

Fine inorganic oxide particles, when included in the composition, are added in an amount of preferably 0.1 to 80 parts by weight, and most preferably 1 to 50 parts by weight, per 100 parts by weight of the above-described organosilicon compounds (a) and (b) combined. At more than 80 parts by weight, the clarity of the cured film obtained from the composition thus prepared tends to decline.

The fine inorganic oxide particles are generally used in the form of a dispersion within a dispersing medium, which is typically water or an organic solvent. When water is used as the dispersing medium for the inorganic oxide particles, the dispersing medium is set within a pH range of preferably 2 to 10, and most preferably 3 to 7. Organic solvents which are suitable as the dispersing medium for the fine inorganic oxide particles include alcohols such as methanol, isopropyl alcohol, ethylene glycol, butanol and ethylene glycol monopropyl ether; ketones such as methyl ethyl ketone and methyl isobutyl ketone; aromatic hydrocarbons such as toluene and xylene; amides such as dimethylformamide, dimethylacetamide and N-methyl-pyrrolidone; esters such as ethyl acetate, butyl acetate and $\gamma$-butyrolactone; and ethers such as tetrahydrofuran and 1,4-dioxane. Of these, alcohols and ketones are preferred. The above organic solvents may be used alone or as mixtures of two or more thereof as the dispersing medium.

Because the resulting system is to be polymerized and cured by exposure to radiation such as ultraviolet light or electron beams, it is advantageous to add a photopolymerization initiator and carry out photopolymerization. Illustrative examples of photopolymerization initiators include arylketone photopolymerization initiators (e.g., acetophenones, benzophenones, alkylaminobenzophenones, benzils, benzoins, benzoin ethers, benzil dimethyl ketals, benzoylbenzoates and $\alpha$-acyloxime esters), sulfur-containing photopolymerization initiators (e.g., sulfides, thioxanthones), acylphosphine oxide photopolymerization initiators, as well as other photopolymerization initiators. The photopolymerization initiator may be used in combination with a photosensitizer such as an amine. Specific examples of suitable photopolymerization initiators include compounds such as 4-phenoxydichloroacetophenone, 4-t-butyldichloroacetophenone, 4-t-butyltrichloroacetophenone, diethoxyacetophenone, 2-hydroxy-2-methyl-1-phenylpropan-1-one, 1-(4-isopropylphenyl)-2-hydroxy-2-methylpropan-1-one, 1-(4-dodecylphenyl)-2-methylpropan-1-one, 1-{4-(2-hydroxyethoxy)phenyl}-2-hydroxy-2-methylpropan-1-one, 1-hydroxycyclohexyl phenyl ketone, 2-methyl-1-{4-(methylthio)phenyl}-2-morpholinopropan-1-one, benzoin, benzoin methyl ether, benzoin ethyl ether, benzoin isopropyl ether, benzoin isobutyl ether, benzyl dimethyl ketal, benzophenone, benzoylbenzoic acid, methyl benzonylbenoate 4-phenylbenzophenone, hydroxybenzophenone, benzophenone acrylate, 3,3'-dimethyl-4-methoxybenzophenone, 3,3',4,4'-tetra(t-butylperoxycarbonyl)benzophenone, 9,10-phenanthrenequinone, camphorquinone, dibenzosuberone, 2-ethylanthraquinone, 4',4"-diethylisophthalophenone, $\alpha$-acyloxime ester, methyl phenylglyoxylate, 4-benzoyl-4'-methyldiphenylsulfide, thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, 2,4-diisopropylthioxanthone, 2,4,6-trimethylbenzoyldiphenylphosphine oxide, benzoyl diphenylphosphine oxide, 2,6-dimethylbenzoyl diphenylphosphine oxide and bis(2,6-dimethoxybenzoyl)-2, 4,4-trimethylpentylphosphine oxide.

The amount of photopolymerization initiator is preferably 0.01 to 20 parts by weight, and most preferably 0.1 to 10 parts by weight, per 100 parts by weight of the combined amount of the (meth)acryl functional group-bearing organosilicon compound prepared by hydrolysis and the (meth) acrylate compound.

The radiation-polymerizable composition from which the protective layer is obtained may also be used after dilution with a solvent. Suitable solvents for this purpose include diacetone alcohol, propylene glycol monomethyl ether, ethylene glycol monomethyl ether, propylene glycol monoethyl ether, ethylene glycol monoethyl ether, isobutyl alcohol, isopropyl alcohol, n-butyl alcohol, n-propyl alcohol, acetone, methyl ethyl ketone, methyl isobutyl ketone, acetyl acetone, ethyl acetate, butyl acetate, xylene and toluene.

By adding any of the below-mentioned known accelerators as a hydrolyzable silyl group hydrolysis/condensation catalyst, condensation of the silanol groups is accelerated and the crosslink density is improved, making it possible to achieve a higher film hardness. Specific examples of suitable accelerators include acid catalysts such as hydrochloric acid, sulfuric acid, phosphoric acid and methanesulfonic acid; alkali catalysts such as sodium hydroxide, potassium hydroxide, sodium methylate, potassium methylate, dimethylamine, triethylamine, 1,8-diazabicyclo[5.4.0]undec-7-ene (DBU), ethanolamine acetate, dimethylaniline formate, benzoic acid, tetraethylammonium salts, sodium acetate, sodium propionate, sodium formate, and benzoyltrimethylammonium acetate; tetra-i-propoxytitanium, tetra-n-butoxytitanium, dibutoxy(bis-2,4-pentanedionato)titanate, tetrabutoxyzirconium, di-i-propoxy(bis-2,4-pentanedionato)titanate, tetra-i-propoxyzirconium, dibutoxy(bis-2,4-pentanedionato)zirconium, di-i-propoxy(bis-2,4-pentanedionato)zirconium, aluminum triisobutoxide, aluminum triisopropoxide, aluminum acetylacetonate, aluminum perchlorate, aluminum chloride, cobalt octylate, cobalt acetylacetonate, zinc octylate, zinc acetylacetonate, iron acetylacetonate, tin acetylacetonate, dibutyltin octylate, dibutyltin laurate; and aminosilanes such as aminopropyltriethoxysilane and 2-aminoethylaminopropyltrimethoxysilane. The accelerator is typically included in an amount of 0.01 to 10 wt %, and preferably 0.02 to 2 wt %, based on the combined amount of organosilicon compounds (a) and (b) serving as the active ingredients.

The film-forming composition of the invention prepared as described above may also have added thereto such optional components as organic or inorganic ultraviolet absorbers, leveling agents, and buffering agents for controlling the system pH within the range of 2 to 7 amenable to the stable presence of silanol groups. Examples of such buffering agents include acetic acid, sodium acetate, dibasic sodium phosphate and citric acid.

The cured film formed on the surface of the substrate from the above-described composition has a thickness of generally 1 to 20 μm, and preferably 1 to 15 μm. No particular limitation is imposed on the method of coating the above composition onto the substrate surface. Examples of suitable coating techniques include dipping, spin coating, flow coating, roll coating, spray coating and screen printing. However, for easy control of the film thickness, application of the composition to the desired film thickness by dipping, spraying or roll coating is preferred.

The film made of the above-described composition of the invention that has been coated onto the surface of the substrate is formed by
(1) a film-forming method that involves curing with irradiation such as ultraviolet light or electron beams, or
(2) a film-forming method that involves curing with irradiation such as ultraviolet light or electron beams, followed by heat curing at a temperature of 30 to 300° C.

Next, the use of (B) a layer composed of a hydrolyzable silyl group-bearing acrylic polymer-containing composition in cured form as the protective layer in the inventive multilayer laminate is described.

The hydrolyzable silyl group-bearing acrylic polymer can be prepared by copolymerizing an acrylic and/or vinyl monomer containing a hydrolyzable silyl group such as an alkoxysilyl group with another monomer that is copolymerizable therewith. Adhesion to the substrate and adhesion to the high refractive index layer are enhanced by introducing hydrolyzable silyl groups onto the ends or side chains of the acrylic polymer. Moreover, crosslinking the hydrolyzable silyl groups enables the protective layer to be imparted with a greater hardness and helps enhance the mar resistance of the surface layer. Such hydrolyzable silyl group-bearing monomers are typically included in a range of 0.1 to 50 wt %. At less than 0.1 wt %, little if any improvement is achieved in adhesion and mar resistance. On the other hand, at more than 50 wt %, the protective layer may become too hard and thus subject to cracking, or may undergo a decline in adhesion. A content of 1 to 30 wt % is preferred.

Illustrative examples of suitable alkoxysilyl group-bearing acrylic monomers include 3-methacryloxypropyltrimethoxysilane, 3-methacryloxypropyltriethoxysilane, 3-methacryloxypropylmethyldimethoxysilane, 3-methacryloxypropylmethyldiethoxysilane, 3-acryloxypropyltrimethoxysilane, 3-acryloxypropyltriethoxysilane, 3-acryloxypropylmethyldimethoxysilane, 3-acryloxypropylmethyldiethoxysilane, 3-methacryloxymethyltrimethoxysilane, 3-methacryloxymethyltriethoxysilane, 3-methacryloxymethylmethyldimethoxysilane, 3-methacryloxymethylmethyldiethoxysilane, 3-acryloxymethyltrimethoxysilane, 3-acryloxymethyltriethoxysilane, 3-acryloxymethylmethyldimethoxysilane and 3-acryloxymethylmethyldiethoxysilane. Of these, 3-methacryloxypropyltrimethoxysilane, 3-methacryloxypropylmethyldimethoxysilane, 3-acryloxypropyltrimethoxysilane and 3-acryloxypropylmethyldimethoxysilane are preferred for such reasons as handling ease, crosslink density and reactivity.

Illustrative examples of suitable alkoxysilyl group-bearing vinyl monomers include vinyltrimethoxysilane, vinyltriethoxysilane, vinyltris(2-methoxyethoxy)silane, vinylmethyldimethoxysilane, vinylmethyldiethoxysilane, vinylmethylbis(2-methoxyethoxy)silane, 3-vinyloxypropyltrimethoxysilane, 3-vinyloxypropyltriethoxysilane, 3-vinyloxypropylmethyldimethoxysilane, 3-vinyloxypropylmethyldiethoxysilane, styryltrimethoxysilane, styryltriethoxysilane, styrylmethyldimethoxysilane and styrylmethyldiethoxysilane. Of these, vinyltrimethoxysilane, vinyltriethoxysilane and 3-vinyloxypropyltrimethoxysilane are preferred for such reasons as handling ease and reactivity.

Other hydrolyzable silyl group-bearing monomers that may be used include acetoxysilyl group-bearing monomers such as vinyltriacetoxysilane and vinylmethyldiacetoxysilane.

The other monomer that is copolymerizable with the above-described hydrolyzable silane may be any known vinyl group-bearing copolymerizable substance. Illustrative examples include alkyl methacrylates (e.g., methyl methacrylate, butyl methacrylate, 2-ethylhexyl methacrylate, cyclohexyl methacrylate, cyclohexyl acrylate, cyclohexylmethyl methacrylate), alkyl acrylates, (e.g., methyl acrylate, ethyl acrylate, butyl acrylate), glycidyl methacrylate, acrylamide, acrylonitrile, (meth)acrylic acids, vinyl acetate, vinyl ethers (e.g., ethyl vinyl ether, butyl vinyl ether, hexyl vinyl ether), styrene, ethylene glycol dimethacrylate, benzotriazole ultraviolet absorbers having a methacryl group (e.g., 2-(2'-hydroxy-5'-methacryloxyethylphenyl)-2H-benzotriazole), and hindered amine light stabilizers having a methacryl group (e.g., 2,2,6,6-tetramethyl-4-piperidinyl methacrylate, 1,2,2,6,6-pentamethyl-4-piperidinyl methacrylate). However, a monomer which is capable of reacting with the alkoxysilyl groups, such as 2-hydroxyethyl methacrylate, is undesirable because it is subject to changes in its properties over time, such as thickening and gelation.

Organic copolymers of the above-described alkoxysilyl group-bearing monomer with the other monomer copolymerizable therewith can easily be prepared by adding a radical polymerization initiator selected from among peroxides (e.g., dicumyl peroxide, benzoyl peroxide) and azo compounds (e.g., azobisisobutyronitrile) to a solution containing these monomers, and reacting under the application of heat.

A hydrolysis/condensation catalyst for the above-described hydrolyzable silyl groups may be added to this organic copolymer to shorten the curing time and increase the degree of crosslinking.

In addition, a hydrolyzable organosilicon compound of general formula (3) below may be included in a hydrolyzed and partially condensed form to enhance the hardness of the film. Compositions containing the above-described hydrolyzable silyl group-bearing acrylic polymer (B) preferably include:

(c) an acrylic polymer having pendant or terminal hydrolyzable silyl groups, and (d) a hydrolyzed and partially condensed form of a hydrolyzable organosilicon compound of general formula (3) below

$$R_m SiR''_n X_{4-m-n} \qquad (3).$$

In formula (3), R is A or R'; A, R', R" and X are as defined above; and the letters m and n are integers from 0 to 3 such that the sum m+n is 0 to 3.

The method of hydrolysis is as described above, and the amount of water used in hydrolysis is preferably such that the molar ratio $H_2O/Si$—X is in a range of 0.1 to 10. The hydrolyzate or hydrolyzate/condensate used may range from a hydrolyzable (alkoxy)silyl group-terminal oligomer to a silanol group-terminal silicone resin.

When a hydrolyzable organosilicon compound in hydrolyzed and partially condensed form (d) is included, it is preferable to add from 0.01 to 2,000 parts by weight per 100 parts by weight of the hydrolyzable silyl group-bearing organic copolymer (C). The use of less than 0.01 part by weight may fail to improve the hardness of the coat, whereas the use of more than 2,000 parts by weight may result in a failure of the coat to adhere to the substrate. The addition of 10 to 1,000 parts by weight is preferred.

To achieve the desired properties in the applied coat, such as hardness, mar resistance and electrical conductivity, it is advantageous to include also fine particles of an inorganic oxide (e.g., silica, aluminum oxide, titanium oxide, zinc oxide, zirconium oxide, cerium oxide, tin oxide, indium oxide, or a complex oxide thereof). Colloidal silica is especially preferable for this purpose. If desired, the fine inorganic oxide particles used in the composition may be surface-treated with an organometallic compound such as a silane, titanium, aluminum or zirconium coupling agent.

Fine inorganic oxide particles, when included in the composition, are added in an amount of preferably 0.1 to 80 parts by weight, and most preferably 1 to 50 parts by weight, per 100 parts by weight of the above-described hydrolyzable silyl group-bearing acrylic polymer. At more than 80 parts by weight, the clarity of the cured film obtained from the composition thus prepared tends to decline.

A conventional ultraviolet absorber may be added to the protective layer to inhibit deterioration of the substrate by light. Ultraviolet absorbers include inorganic ultraviolet absorbers such as fine titanium oxide particles and fine zinc oxide particles, and organic ultraviolet absorbers. Preferred organic ultraviolet absorbers include derivatives of compounds having a hydroxybenzophenone, benzotriazole, cyanoacrylate or triazine skeleton. Polymers such as vinyl polymers containing these ultraviolet absorbers on side chains are especially preferred. Specific examples include 2,4'-dihydroxybenzophenone, 2,2',4,4'-tetrahydroxybenzophenone, 2-hydroxy-4-methoxybenzophenone, 2-hydroxy-4-methoxybenzophenon-5-sulfonic acid, 2-hydroxy-4-n-octoxybenzophenone, 2-hydroxy-4-n-dodecyloxybenzophenone, 2-hydroxy-4-n-benzyloxybenzophenone, 2,2'-dihydroxy-4,4'-dimethoxybenzopheone, 2,2'-dihydroxy-4,4'-diethoxybenzophenone, 2,2'-dihydroxy-4,4'-dipropoxybenzophenone, 2,2'-dihydroxy-4,4'-dibutoxybenzophenone, 2,2'-dihydroxy-4-methoxy-4'-propoxybenzophenone, 2,2'-dihydroxy-4-methoxy-4'-butoxybenzophenone, 2,3,4-trihydroxybenzophenone, 2-(2-hydroxy-5-t-methyl-phenyl)benzotriazole, 2-(2-hydroxy-5-t-octylphenyl)benzotriazole, 2-(2-hydroxy-3,5-di-t-butylphenyl)benzotriazole, ethyl-2-cyano-3,3-diphenyl acrylate, 2-ethylhexyl-2-cyano-3,3-diphenyl acrylate, 2-(2-hydroxy-4-hexyloxyphenyl)-4,6-diphenyltriazine, 4-(2-acryloxyethoxy)-2-hydroxybenzophenone polymers and 2-(2'-hydroxy-5'-methacryloxyethylphenyl)-2H-benzotriazole polymers. These organic ultraviolet absorbers may be used singly or in combinations of two or more thereof.

When an ultraviolet absorber is used in the composition, it is included in an amount (solids basis) of preferably 0.1 to 30 parts by weight, and most preferably 1 to 20 parts by weight, per 100 parts by weight of the above-described hydrolyzable silyl group-bearing acrylic polymer. The addition of more than 30 parts by weight of fine inorganic oxide particles tends to lower the adhesive properties of the cured film formed from the prepared composition.

The film-forming composition used in the invention and obtained as described above may also include such optional ingredients as a solvent and a leveling agent.

The coating method and film thickness preferably satisfy the conditions indicated above. Curing is generally carried out under the application of heat, preferably within a temperature range of 50 to 150° C. and for a length of time within a range of about 1 minute to about 3 hours.

A third way of forming the protective layer in the multilayer laminate of the invention involves the use of a thermoplastic acrylic polymer.

Illustrative examples of suitable thermoplastic acrylic copolymers include poly(alkyl methacrylates) and poly(alkyl acrylates) such as poly(methyl methacrylate), poly(butyl methacrylate), poly(butyl acrylate) and poly(2-ethylhexyl methacrylate), as well as copolymers thereof. Functional group-bearing monomers such as glycidyl (meth)acrylate, dimethyl acrylamide and (meth)acrylic acid may be copolymerized within the above polymers to enhance the adhesive properties. The acrylic copolymer must have a certain degree of hardness to impart good mar resistance. The use of poly(methyl methacrylate) as the main ingredient is desirable for this purpose. A polymer of this type having a glass transition temperature of at least 40° C., and preferably at least 50° C., is particularly advantageous.

Any suitable technique may be used to form the thermoplastic acrylic polymer layer, such as coating, then drying a solution of the acrylic polymer dissolved in a solvent, or using an extruder to apply a film of molten acrylic polymer. The acrylic polymer layer has a thickness of preferably at least 1 μm, and most preferably from 5 to 100 μm. Too low a film thickness is undesirable because sufficient hardness cannot be achieved, whereas too high a thickness is economically disadvantageous.

To achieve the desired properties in the applied coat, such as hardness, mar resistance and electrical conductivity, it is desirable to include in this system fine particles of an inorganic oxide such as microparticulate silica, aluminum oxide, zirconium oxide, titanium oxide, zinc oxide, tin oxide, cerium oxide, indium oxide or a complex oxide thereof, which are dispersible in an organic solvent such as an alcohol (e.g., methanol, ethanol, isopropanol, isobutanol) or an ester (e.g., butyl acetate), or are water-dispersible. If desired, the fine inorganic oxide particles used in the composition may be surface-treated with an organometallic compound such as a silane, titanium, aluminum or zirconium coupling agent. The amount of fine inorganic oxide particles included in the composition is preferably from 0 to 30 wt % based on the active ingredient (acrylic polymer).

A conventional ultraviolet absorber may be added to the protective layer to inhibit deterioration of the substrate by light. Suitable ultraviolet absorbers for this purpose include those mentioned above. When an ultraviolet absorber is used in the composition, it is included in an amount (solids basis) of preferably 0.1 to 30 parts by weight, and most preferably 1 to 20 parts by weight, per 100 parts by weight of the above-described thermoplastic acrylic polymer. The addition of more than 30 parts by weight of ultraviolet absorber tends to lower the adhesive properties of the cured film obtained from the prepared composition.

The film-forming composition used in the invention and obtained as described above may also include such optional ingredients as a solvent and a leveling agent.

The coating method and film thickness preferably satisfy the conditions indicated above. Film formation may be carried out by applying the solution, then vaporizing off the solvent in a temperature range of room temperature to 150° C. The protective film has a thickness of preferably at least 1 μm, more preferably 5 to 100 μm, and most preferably 5 to 30 μm.

Next, the high refractive index layer provided on the protective film is described. It is critical for the high refractive index layer to contain a metal oxide sol and to have a refractive index of at least 1.60. To obtain high antireflective properties, a refractive index of at least 1.64 is preferred. Although there is no particular upper limit on the refractive index of the high refractive index layer, the refractive index is generally not more than 2.20.

The metal oxide sol included for increasing the refractive index is preferably fine particles having a refractive index of at least 1.6. This high refractive index metal oxide sol has an average particle size of preferably 1 to 100 nm, and most preferably 1 to 50 nm. No particular limitation is imposed on the amount of high refractive index metal oxide sol included, although an amount of 5 to 500 parts by weight, and especially 70 to 250 parts by weight, per 100 parts by weight of the curable components in the high refractive index layer-forming composition is preferred. The use of more than 500 parts by weight tends to give rise to undesirable effects such as haze in the cured film, whereas the use of less than 5 parts by weight may fail to increase the refractive index.

A high refractive index metal oxide sol with a refractive index which is higher than that of the cured resin in the cured layer and is at least 1.6 is desirable for increasing the refractive index of the high refractive index layer in its cured form. Specific examples of preferred high refractive index metal oxide sols include metal oxides such as ZnO (n=1.90), $TiO_2$ (n=2.3 to 2.7), $Sb_2O_5$ (n=1.71), $Y_2O_3$ (n=1.87), $La_2O_3$ (n=1.95), $ZrO_2$ (n=2.05), $Al_2O_3$ (n=1.63) and the complex oxide of indium and tin ITO (n=1.95), as well as complex oxides including any of the above. Other metal oxide sols such as $In_2O_3$, $SnO_2$ and $CeO_2$ may also be used. The use of a titanium atom-containing metal oxide sol having a high refractive index is especially preferred. The high refractive index metal oxide sol may be surface-modified with a silane compound, an organic functional group-containing silane coupling agent or titanium coupling agent, or an organic functional group-containing acrylic polymer in order to enhance the dispersion stability.

Examples of dispersants that may be used to disperse the high refractive index metal oxide sol include water, alcohols such as methanol and ethanol, esters such as ethyl acetate and butyl acetate, ethers such as propylene glycol monoethyl ether and ketones such as methyl ethyl ketone and methyl isobutyl ketone.

Curable resins that may be used to form the high refractive index cured layer include known organic resins and silicone resins such as thermoset acrylic resins, moisture-curable acrylic resins, thermoplastic acrylic resins, UV-curable acrylic resins, silane or siloxane-modified acrylic resins, urethane resins, and UV-curable epoxy resins. Silicone resins prepared by hydrolyzing various hydrolyzable silane compounds or additionally subjecting them to (partial) condensation are especially preferred because the resulting film has a high hardness and good adhesion to the above-described protective layer and the low refractive index layer described subsequently. UV curable acrylic and epoxy resins are also desirable because they provide the resulting film with excellent adhesion and are conducive to a high productivity. When a silicone resin is used, it is preferable to use also the above-described (hydrolysis) condensation catalyst. The amount of catalyst included in the composition is as described above.

A coating composed of a mixture of the above-described high refractive index metal oxide sol and curable resin may be applied by any of the methods mentioned above. The conditions for curing the applied coat may be the same as the curing conditions for the curable resin.

The high refractive index curable composition may also be used after dilution with a solvent. Suitable solvents for this purpose include methanol, ethanol, diacetone alcohol, propylene glycol monomethyl ether, ethylene glycol monomethyl ether, propylene glycol monoethyl ether, ethylene glycol monoethyl ether, isobutyl alcohol, isopropyl alcohol, n-butyl alcohol, n-propyl alcohol, acetone, methyl ethyl ketone, methyl isobutyl ketone, acetylacetone, ethyl acetate, butyl acetate, xylene and toluene.

If necessary, known additives (e.g., leveling agents) that are used in prior-art coatings may also be included.

To maintain the desired optical characteristics (e.g., antireflective properties), the cured film formed as the high refractive index layer should be a thin film having a low thickness in accordance with the refractive index. A film thickness of 0.02 to 1 μm, and especially 0.05 to 0.5 μm, is preferred.

Finally, the low refractive index layer provided on the high refractive index layer is described. To provide a low refractive index and good film hardness, the low refractive index layer is preferably made of the two types of fluorinated organic group-bearing silicone resins described below. The film has a refractive index of preferably 1.45 or less. To achieve better antireflective properties, a refractive index of 1.43 or less is especially preferred. There is no lower limit on the refractive index of this layer, although the refractive index is generally at least 1.30.

The first type of fluorinated organic group-bearing silicone resin is prepared by hydrolyzing:
(e) a fluorinated organosilicon compound of general formula (4) below $$Rf—SiR''_bX_{3-b} \quad (4)$$

wherein Rf is a fluorinated $C_{4-20}$ organic group, R" and X are as defined above, and the letter b is an integer from 0 to 2;
(f) an organosilicon compound of general formula (5) below $$CF_3CH_2CH_2—SiR''_cX_{3-c}: \quad (5)$$

wherein R" and X are as defined above, and the letter c is an integer from 0 to 2; and
(g) an organosilicon compound of general formula (6) below $$SiX_4 \quad (6)$$

wherein X is as defined above.

The second type of fluorinated organic group-bearing silicone resin is a (meth)acryl functional group-bearing silicone resin obtained by hydrolyzing silane compounds which include:
(h) a fluorinated organosilicon compound of general formula (7) below $$Rf—SiR''_bY_{3-b} \quad (7)$$

wherein Y is X or a hydroxyl group; and Rf, R", X and b are as defined above, and
(a) a (meth)acryl functional group-bearing organosilicon compound of general formula (1) below $$A—SiR''_aX_{3-a} \quad (1)$$

wherein A, R", X and a are as defined above.

The fluorinated organic substituent Rf is included so as to lower the refractive index and thus enable excellent antireflective properties to be achieved. Increasing the fluorine content lowers the refractive index of the layer. For the purposes of the invention, the Rf group is a polyfluoroalkyl group of the formula $C_kF_{2k+1}—X_x—$ or $CF_3CF_2CF_2O(CF(CF_3)CF_2O)_3 CF(CF_3)X_x—$ which may contain one or more ether bond. Here, X is one or more linkage selected from among $(CH_2)_y$, $CH_2O$, NY, $CO_2$, CONY, S, $SO_3$ and $SO_2NY$; Y is a hydrogen atom or a $C_{1-8}$ alkyl; the letter k is an integer from 2 to 20; the letter j is an integer which is at least 1, preferably 1 to 50, and most preferably 1 to 20; the letter x is 1 or 2; and the letter y is an integer from 1 to 3.

Suitable examples of silanes having the above general formula include the following:

$R'f(CH_2)_2Si(OCH_3)_3$, $R'f(CH_2)_2Si(OC_2H_5)_3$, $R'f(CH_2)_2SiCl_3$, $R'f(CH_2)_2Si(OC(CH_3)=CH_2)_3$, $R'f(CH_2)_2SiCH_3(OCH_3)_2$, $R'f(CH_2)_3Si(OCH_3)_3$, $R'f(CH_2)_3SiCH_3(OCH_3)_2$, $R'fNH(CH_2)_2Si(OCH_3)_2$, $R'fNH(CH_2)_3SiCH_3(OCH_3)_2$, $R'fNH(CH_2)_3Si(OCH_2CH_3)_3$, $R'fNH(CH_2)_2NH(CH_2)_3Si(OCH_3)_3$, $R'fNH(CH_2)_2NH(CH_2)_3SiCH_3(OCH_3)_2$, $R'fNH(CH_2)_2NH(CH_2)_3Si(OCH_2CH_3)_3$, $R'fCONH(CH_2)_3Si(OCH_3)_3$, $R'fCONH(CH_2)_3Si(OCH_2CH_3)_3$, $R'fCONH(CH_2)_3SiCH_3(OCH_3)_2$, $R'fSO_2NH(CH_2)_3Si(OCH_3)_3$, $R'fSO_2NH(CH_2)_3Si(OCH_2CH_3)_3$, $R'fSO_2NH(CH_2)_3SiCH_3(OCH_3)_2$, $R'fCO_2(CH_2)_3Si(OCH_3)_3$, $R'fCO_2(CH_2)_3Si(OCH_2CH_3)_3$ and $R'fCO_2(CH_2)_3SiCH_3(OCH_3)_2$.

In the above formulas, the R'f groups represent $C_kF_{2k+1}$ (wherein k is an integer from 2 to 20), such as $C_2F_5$, $C_3F_7$, $C_4F_9$, $C_6F_{13}$, $CF_{17}$, $C_{10}F_{21}$, $C_{12}F_{25}$, $C_{14}F_{29}$, $C_{16}F_{33}$, $C_{18}F_{37}$ and $C_{20}F_{41}$.

Illustrative examples of silane compounds having an ether bond include the following:

$$CF_3CF_2CF_2O(CFCF_2O)_jCFCONH(CH_2)_3Si(OCH_3)_3$$
$$| \qquad \quad |$$
$$CF_3 \qquad CF_3$$

$$CF_3CF_2CF_2O(CFCF_2O)_jCFCONH(CH_2)_3Si(OCH_2CH_3)_3$$
$$| \qquad \quad |$$
$$CF_3 \qquad CF_3$$

$$CF_3CF_2CF_2O(CFCF_2O)_jCFCONH(CH_2)_3Si(OCH_3)_3$$
$$| \qquad \quad |$$
$$CF_3 \qquad CF_3$$

$$CF_3CF_2CF_2O(CFCF_2O)_jCFCOO(CH_2)_3Si(OCH_3)_3$$
$$| \qquad \quad |$$
$$CF_3 \qquad CF_3$$

$C_3F_7O(CF(CF_3)CF_2O)_3CF(CF_3)CH_2O(CH_2)_3Si(OCH_3)_3$, $C_3F_7O(CF(CF_3)\;CF_2O)_3CF\;(CF_3)CH_2O(CH_2)_3Si\;(OCH_2CH_3)_3$ and $C_3F_7O(CF(CF_3)CF_2O)_3CF(CF_3)CH_2O(CH_2)_3SiCH_3(OCH_3)_2$.

The following are especially preferred:

$C_4F_9(CH_2)_2Si(OCH_3)_3$, $C_4F_9(CH_2)_2Si(OCH_2CH_3)_3$, $C_4F_9(CH_2)_2SiCH_3(OCH_3)_2$, $C_4F_9(CH_2)_2SiCl_3$, $C_8F_{17}(CH_2)_2Si(OCH_3)_3$, $C_8F_{17}(CH_2)_2Si(OCH_2CH_3)_3$, $C_8F_{17}(CH_2)_2SiCH_3(OCH_3)_2$, $C_3F_7O(CF(CF_3)CF_2O)_3CF(CF_3)CH_2O(CH_2)_3Si(OCH_3)_3$, $C_3F_7O(CF(CF_3)CF_2O)_3CF(CF_3)CH_2O(CH_2)_3Si(OCH_2CH_3)_3$ and $C_3F_7O(CF(CF_3)CF_2O)_3CF(CF_3)CH_2O(CH_2)_3SiCH_3(OCH_3)_2$.

Next, the trifluoropropylsilane compound (f) is described. The fluoroalkyl group-bearing silane compound (e) and the tetrafunctional hydrolyzable silane compound (g) have a poor compatibility. The compatibility of compounds (e) and (g) can be increased by also using trifluoropropylsilane, enabling a uniform film to be obtained.

Specific examples of suitable trifluoropropylsilane compounds include:

CF$_3$CH$_2$CH$_2$Si(OCH$_3$)$_3$,

CF$_3$CH$_2$CH$_2$Si(OCH$_2$CH$_3$)$_3$,

CF$_3$CH$_2$CH$_2$SiCl$_3$,

CF$_3$CH$_2$CH$_2$Si(OC(CH$_3$)=CH$_2$)$_3$,

CF$_3$CH$_2$CH$_2$SiCH$_3$(OCH$_3$)$_2$,

CF$_3$CH$_2$CH$_2$SiCH$_3$(OCH$_2$CH$_3$)$_2$ and

CF$_3$CH$_2$CH$_2$SiCH$_3$Cl$_2$.

The use of CF$_3$CH$_2$CH$_2$Si(OCH$_3$)$_3$ or CF$_3$CH$_2$CH$_2$SiCH$_3$(OCH$_3$)$_2$ is preferred for ease of handling and control of the reactivitiy.

Next, the tetrafunctional hydrolyzable silane compound (g) having general formula SiX$_4$ is described. This compound contributes to the formation of a cured film having a high crosslink density and a high hardness, and is thus important for achieving excellent mar resistance.

Specific examples include Si(OCH$_3$)$_4$, Si(OCH$_2$CH$_3$)$_4$, Si(OC$_3$H$_7$)$_4$ and Si(OC$_4$H$_9$)$_4$. Alternatively, partial hydrolyzates of these compounds, or oligomeric compounds obtained by (partial) condensation thereof, may be used.

It is preferable for these compounds (e), (f) and (g) to be included within the silane composition in amounts within the respective ranges of 1 to 50 mol %, 10 to 90 mol %, and 9 to 80 mol %. The presence of component (e) in an amount less than 1 mol % may fail to provide much improvement in the refractive index and may result in poor antireflective properties. On the other hand, more than 50 mol % of component (e) may make it impossible to achieve a film of sufficient hardness, which can result in a poor mar resistance. The addition of less than 10 mol % of component (f) can fail to provide sufficient compatibility between the components and thus result in a non-uniform film; whereas an amount greater than 90 mol % may lead to an insufficient decrease in the refractive index and may also result in an inadequate mar resistance. The addition of less than 9 mol % of component (g) may lead to a poor crosslink density and inadequate mar resistance, whereas more than 80 mol % may make the film too hard and thus subject to cracking. The presence of component (e) in a range of 2 to 30 mol %, of component (f) in a range of 20 to 80 mol % and of component (g) in a range of 15 to 60 mol % is especially preferred.

Any of the known methods mentioned above may be used to hydrolyze these silane compounds. Examples of suitable methods include methods in which components (e), (f) and (g) are mixed and all hydrolyzed together; methods in which component (f) is mixed with component (e) or component (g) and the mixture is subjected to preliminary hydrolysis, following which the remaining component is added and additional hydrolysis is carried out; and methods in which components (e), (f) and (g) are each separately hydrolyzed, then mixed together. A method which involves mixing components (e), (f) and (g), and-hydrolyzing all the components together is especially preferred for achieving good uniformity. Other considerations relating to hydrolysis, such as the catalyst, diluting solvent and temperature conditions used, are the same as described earlier.

It is preferable to carry out hydrolysis using an amount of water that sets the molar ratio H$_2$O/Si—X at from 0.1 to 10. That is, the hydrolyzate or hydrolyzate/condensate used in the invention may range from an alkoxy-terminal oligomer to a silanol-terminal silicone resin. In cases where the composition is cured immediately after coating, it is advantageous for the amount of water to be set at H$_2$O/Si—X≧1.0 so that the silane compounds hydrolyze completely.

To enhance the hardness of the applied coat, it is desirable to include in the composition fine particles of an inorganic oxide, such as microparticulate silica, aluminum oxide, zirconium oxide, zinc oxide, titanium oxide, tin oxide or a complex oxide thereof, which are dispersible in an organic solvent such as an alcohol (e.g., methanol, ethanol, isopropanol, isobutanol) or an ester (e.g., butyl acetate), or are water-dispersible. The use of colloidal silica having a low refractive index is preferable for obtaining the desired refractive index. The amount of fine inorganic oxide particles included in the composition is preferably from 0 to 30 wt %, based on the active ingredient (fluorinated organic group-bearing silicone resin).

Other components that may be included in the low refractive index layer-forming composition include the earlier-described hydrolysis/condensation catalysts, diluting solvents, leveling agents and ultraviolet absorbers.

In addition to the above silane compounds, a bifunctional component such as (CH$_3$)$_2$Si(OCH$_3$)$_2$, (CH$_3$)$_2$Si(OCH$_2$CH$_3$)$_2$, C$_6$H$_5$(CH$_3$)Si(OCH$_3$)$_2$, (C$_6$H$_5$)$_2$Si(OCH$_3$)$_2$ or HO((CH$_3$)$_2$SiO)$_{10}$H may be used to impart flexibility to the film; a silane compound having polyfunctional silyl groups at both ends, such as (CH$_3$O)$_3$Si(CH$_2$)$_2$Si(OCH$_3$)$_3$, (CH$_3$CH$_2$O)$_3$Si(CH$_2$)$_2$Si(OCH$_2$CH$_3$)$_3$, (CH$_3$O)$_2$(CH$_3$)Si(CH$_2$)$_2$Si(CH$_3$)(OCH$_3$)$_2$, (CH$_3$O)$_3$Si(CH$_2$)$_6$Si(OCH$_3$)$_3$, (CH$_3$O)$_3$SiC$_6$H$_4$Si(OCH$_3$)$_3$, (CH$_3$O)$_3$SiCH$_2$CH$_2$C$_6$H$_4$CH$_2$CH$_2$Si(OCH$_3$)$_3$, (CH$_3$O)$_3$SiO((CH$_3$)$_2$SiO)$_6$Si(OCH$_3$)$_3$ or (CH$_3$O)$_3$SiCH$_2$CH$_2$((CH$_3$)$_2$SiO)$_9$Si(CH$_3$)$_2$OSi(OCH$_3$)$_3$, may be used to contribute to crosslinking and thereby further increase the hardness; and a silane having a fluorine-bearing divalent organic group on the main chain, such as (CH$_3$O)$_3$SiCH$_2$CH$_2$C$_6$F$_{12}$CH$_2$CH$_2$Si(OCH$_3$)$_3$, (CH$_3$O)$_2$(CH$_3$)SiCH$_2$CH$_2$C$_6$F$_{12}$CH$_2$CH$_2$Si(CH$_3$)(OCH$_3$)$_2$ or (CH$_3$O)$_3$Si-PFPE-Si(OCH$_3$)$_3$ (wherein PFPE is a perfluoropolyether-containing divalent substituent)

may be used to enhance the refractive index. Moreover, various silane coupling agents, such as $CH_3Si(OCH_3)_3$, $C_6H_5Si(OCH_3)_3$, $C_6H_{13}Si(OCH_3)_3$ and silane coupling agents bearing organic functional groups (e.g., epoxy, (meth)acryl, mercapto) may also be used.

The coating method and curing method may be the same as those used when a silicone compound is employed as the base resin. After the composition has been coated on the substrate, it is preferable to subject it to heat curing for a period of about 1 minute to 3 hours at a temperature within a range of 30 to 150° C. at which the plastic in the substrate does not soften.

To maintain the desired optical characteristics (e.g., antireflective properties), the cured film formed as the low refractive index layer should be a thin film having a low thickness in accordance with the refractive index. A film thickness of 0.02 to 1 μm, and especially 0.05 to 0.5 μm, is preferred.

The second type of fluorinated organic group-bearing silicone resin that may be used to form the low refractive index layer is a (meth)acryl functional group-bearing silicone resin prepared by the hydrolysis or partial hydrolysis of at least (h) a fluorinated organic group-bearing silane compound and (a) a (meth)acryl functional group-bearing organosilicon compound. Compound (h) may be the same as compound (e) or a hydrolyzate of compound (e).

Silane compounds (h) and (a) which are used in this case are as described above. It is preferable to include 1 to 50 mol % of silane compound (h) and 2 to 50 mol % of silane compound (a), based on the overall amount of silane compounds. Less than 1 mol % of compound (h) may fail to adequately lower the refractive index of the film that forms, whereas more than 50 mol % may soften the film and thus prevent a good mar resistance from being achieved. The addition of compound (h) in an amount of 3 to 30 mol % is especially preferred. Less than 2 mol % of compound (a) tends to result in a low crosslink density in the film that forms, whereas more than 50 mol % may make the film too hard and thus prone to cracking. The addition of compound (a) in an amount of 5 to 40 mol % is especially preferred.

In addition to the above silane compounds, a bifunctional component such as $(CH_3)_2Si(OCH_3)_2$, $(CH_3)_2Si(OCH_2CH_3)_2$, $C_6H_5(CH_3)Si(OCH_3)_2$, $(C_6H_5)_2Si(OCH_3)_2$ or $HO((CH_3)_2SiO)_{10}H$ may be used to impart flexibility to the film; a silane compound having polyfunctional silyl groups at both ends, such as $(CH_3O)_3Si(CH_2)_2Si(OCH_3)_3$, $(CH_3CH_2O)_3Si(CH_2)_2Si(OCH_2CH_3)_3$, $(CH_3O)_2(CH_3)Si(CH_2)_2Si(CH_3)(OCH_3)_2$, $(CH_3O)_3Si(CH_2)_6Si(OCH_3)_3$, $(CH_3O)_3SiC_6H_4Si(OCH_3)_3$, $(CH_3O)_3SiCH_2CH_2C_6H_4CH_2CH_2Si(OCH_3)_3$, $(CH_3O)_3SiO((CH_3)_2SiO)_6Si(OCH_3)_3$ or $(CH_3O)_3SiCH_2CH_2((CH_3)_2SiO)_9Si(CH_3)_2OSi(OCH_3)_3$, may be used to contribute to crosslinking and thereby further increase the hardness; and a silane having a fluorine-bearing divalent organic group on the main chain, such as $CF_3CH_2CH_2Si(OCH_3)_3$, $CF_3CH_2CH_2Si(OCH_2CH_3)_3$, $CF_3CH_2CH_2Si(OCOCH_3)_3$, $CF_3CH_2CH_2SiCH_3(OCH_3)_2$, $CF_3CH_2CH_2SiCH_3(OCH_2CH_3)_2$, $(CH_3O)_3SiCH_2CH_2C_6F_{12}CH_2CH_2Si(OCH_3)_3$, $(CH_3O)_2(CH_3)SiCH_2CH_2C_6F_{12}CH_2CH_2Si(CH_3)(OCH_3)_2$ or $(CH_3O)_3Si\text{-}PFPE\text{-}Si(OCH_3)_3$ (wherein PFPE is a perfluoropolyether-containing divalent substituent)

may be used to enhance the refractive index. Moreover, various silane coupling agents, such as $CH_3Si(OCH_3)_3$, $C_6HSi(OCH_3)_3$, $C_6Hl_3Si(OCH_3)_3$ and silane coupling agents bearing organic functional groups other than (meth)acryl functional groups (e.g., epoxy, mercapto) may also be used.

Any of the known methods mentioned above may be used to hydrolyze these silane compounds. Examples of suitable methods include methods in which all the components, including components (h) and (a), are mixed and hydrolyzed together; and methods in which components (h) and (a) are separately hydrolyzed, then mixed together. A method which involves mixing components (h) and, (a), and hydrolyzing them together is especially preferred for achieving good uniformity. Other considerations relating to hydrolysis, such as the catalyst, diluting solvent and temperature conditions used, are the same as described earlier.

It is preferable to carry out hydrolysis using an amount of water such that the molar ratio $H_2O/Si\text{---}X$ is from 0.1 to 10. That is, the hydrolyzate or hydrolyzate/condensate used in the invention may range from an alkoxy-terminal oligomer to a silanol-terminal silicone resin. In cases where the composition is cured immediately after coating, it is advantageous for the amount of water to be set at $H_2O/Si\text{---}X \geq 1.0$ so that the silane compounds hydrolyze completely.

A fluoroalkyl group-bearing monofunctional or polyfunctional (meth)acrylate compound may be used to lower the refractive index even further. Specific examples of such compounds include $CF_3(CH_2)_2COOCH\text{=}CH_2$, $C_3F_7(CH_2)_2COOCH\text{=}CH_2$, $C_6F_{13}(CH_2)_2COOCH\text{=}CH_2$, $C_8F_{17}(CH_2)_2COOCH\text{=}CH_2$, $CF_3(CH_2)_2COOC(CH_3)\text{=}CH_2$,

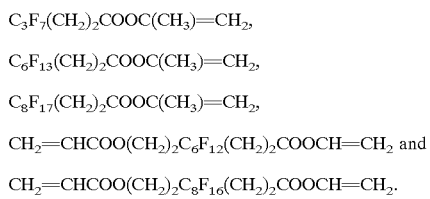

The amount in which this (meth)acrylate compound is included varies with the intended use of the inventive multilayer laminate and is not subject to any particular limitation. However, it is generally desirable to include from 5 to 1,000 parts by weight, and preferably 10 to 300 parts by weight, of the foregoing (meth)acrylate compound per 100 parts by weight of the above-described hydrolyzate or a condensate thereof.

To enhance the hardness of the applied coat, it is desirable to include in this system fine particles of an inorganic oxide, such as microparticulate silica, aluminum oxide, zirconium oxide, zinc oxide, titanium oxide, tin oxide or a complex oxide thereof, which are dispersible in an organic solvent such as an alcohol (e.g., methanol, ethanol, isopropanol, isobutanol) or an ester (e.g., butyl acetate), or are water-dispersible. The use of colloidal silica having a low refractive index is preferable for obtaining the desired refractive index. The amount of fine inorganic oxide particles included in the composition is preferably from 0 to 30 wt %, based on the active ingredient (the foregoing silicone resin).

Because the resulting system is to be polymerized and cured by exposure to radiation such as ultraviolet light or electron beams, it is advantageous to add a photopolymerization initiator and carry out photopolymerization. Illustrative examples of photopolymerization initiators include arylketone photopolymerization initiators (e.g., acetophenones, benzophenones, alkylaminobenzophenones, benzils, benzoins, benzoin ethers, benzil dimethyl ketals, benzoylbenzoates and α-acyloxime esters), sulfur-containing photopolymerization initiators (e.g., sulfides, thioxanthones), acylphosphine oxide photopolymerization initiators, as well as other photopolymerization initiators. The photopolmerization initiator may be used in combination with a photosensitizer such as an amine. Specific examples of suitable photopolymerization initiators include those mentioned above. The amount of photopolymerization initiator is preferably 0.01 to 20 parts by weight, and most preferably 0.1 to 10 parts by weight, per 100 parts by weight of the combined amount of the (meth)acryl functional group and fluorinated group-bearing organosilicon compound and the (meth)acrylate compound.

Aside from the above, the low refractive index layer-forming composition may also include other suitable constituents such as the above-mentioned hydrolysis or condensation catalysts, organic solvents for dilution, ultraviolet absorbers and leveling agents. Specific examples of these additional constituents and the amounts in which they may be added are as mentioned above.

The same methods as those described above in connection with radiation-curable coating systems may be used to coat and cure the low refractive index layer-forming composition.

In addition to the lamination of each of the above layers, various types of oil-repelling, stain-proofing films may also be laminated. An oil-repelling, stain-proofing film can be provided in order to prevent the adherence of fingerprints and other oily grime during the use of antireflective components obtained by means of the invention, and to facilitate the removal of such grime. Moreover, if the multilayer laminate lacks sufficient hardness, a silicone-based hard coat layer may be provided between the protective layer and the high refractive index layer.

The transparent substrate on which are laminated several layers of the various above-described coatings is typically made of glass, ceramic or plastic. Any plastic having excellent optical characteristics may be used for this purpose. Illustrative, non-limiting examples include polycarbonated resins, polyalylene terephthalate resins such as PET, cellulose resins such as cellulose diacetate, cellulose acetate butyrate and cellulose triacetate, acrylic resins, polyimide resins, polyester resins, polyethersulfone resins, liquid crystal resins such as polyarylates, polyurethane resins, polysulfone resins, polyetherketone resins, and polyolefin resins such as trimethylpentene. Of these, polycarbonate resins, polyalkylene terephthalate resins such as PET, and cellulose triacetate resins are especially preferred. The transparent substrate may be in the form of a molded component, a sheet or a film. A film-type transparent substrate is especially preferred for ease of handling during the coating operations.

The transparent substrate has a refractive index of preferably at least 1.40. "Refractive index," as referred to herein, refers to the value measured with an Abbe refractometer at a temperature of 20° C. using the sodium D line as the light source.

Use of the inventive multilayer laminate prepared by laminating the respective above-described coatings onto a transparent substrate as an antireflective component endowed with excellent mar resistance may also involve attachment to another transparent substrate. In such cases, it is advantageous to provide a known acrylic, epoxy, polyimide or silicone pressure-sensitive adhesive or non-pressure-sensitive adhesive on the side of the substrate opposite that on which the various antireflective coatings have been laminated. An acrylic or silicone adhesive is especially preferred. This layer typically has a thickness of 1 to 500 μm. If the adhesive layer is too thin, a good bond strength may not be achieved. On the other hand, an adhesive layer that is too thick may be economically undesirable. In addition, a protective plastic sheet for protecting the surface may be provided on top of the adhesive layer.

EXAMPLES

Synthesis examples, examples of the invention, and comparative examples are given below by way of illustration, but are not intended to limit the scope of the invention. In the examples, all parts and percent are by weight. Average molecular weight values appearing in the specification are polystyrene equivalent average molecular weights determined by gel permeation chromatography.

Synthesis Example 1

A one-liter flask equipped with a stirrer, a condenser and a thermometer was charged with γ-acryloxypropyltrimethoxysilane (82.0 g, 0.35 mol), γ-acryloxypropylmethyldimethoxysilane (32.7 g, 0.15 mol), tetraethoxysilane (104.2 g, 0.50 mol) and isobutanol (50 g). Next, 65 g of 0.1 N acetic acid in water was added dropwise over the course of one hour while stirring the flask contents at 10° C. Stirring was subsequently continued at room temperature for 5 hours, bringing hydrolysis to completion. Diacetone alcohol (150 g), aluminum acetylacetonate (1 g) as the condensation catalyst and polyether-modified silicone (1 g) as the leveling agent were added to the reaction mixture, following which the flask contents were stirred for another 30 minutes, yielding an acryl functional group-bearing silicone solution A.

Next, trimethylolpropane triacrylate (50 g) as a polyfunctional acrylic component, propylene glycol monomethyl ether (50 g), and 2-hydroxy-2-methyl-1-phenylpropan-1-one (1 g) as the photoreaction initiator were added to 100 g of silicone solution A and the mixture was stirred, giving a protective coating fluid A-1.

Synthesis Example 2

A one-liter flask equipped with a stirrer, a condenser and a thermometer was charged with γ-methacryloxypropyltrimethoxysilane (24.8 g, 0.10 mol) and isopropanol (450 g), following which 300 g of water-dispersed colloidal silica (active ingredient content, 20%) was added dropwise. Next, tetrmethylammonium hydroxide (0.1 g) was added and the mixture was stirred for 3 hours under heating at 50° C., yielding a silica sol B that was surface-treated with methacryl functional silane.

Acryl functional group-bearing silicone solution A (40 g), trimethylolpropane triacrylate (40 g), hexamethylenediol diacrylate (20 g) and 2-hydroxy-2-methyl-1-phenylpropan-1-one (1 g) were added to 100 g of surface-treated silica sol B, and the mixture was stirred, giving a protective coating fluid B-1.

Synthesis Example 3

A one-liter flask equipped with a stirrer, a condenser and a thermometer was charged with 330 g of a 2:1 mixture of the solvents diacetone alcohol and methyl isobutyl ketone, and the temperature was raised to 80° C. Next, a mixture of γ-methacryloxypropyltrimethoxysilane (24.8 g, 0.10 mol), methyl methacrylate (180 g, 1.80 mol), glycidyl methacrylate (14.2 g, 0.10 mol) and azobisisobutyronitrile (2 g) was added dropwise over 30 minutes to the solvent mixture under a nitrogen atmosphere while the flask contents were heated and stirred. Heating and stirring at 80° C. were continued for another 5 hours, giving a solution C of hydrolyzable silyl group-bearing acrylic polymer having a number-average molecular weight of 125,000.

In a separate procedure, 60 g of 0.1 N acetic acid in water was added dropwise over 30 minutes to a solution prepared by mixing together 136 g of methyltrimethoxysilane (1.00 mol) and 72 g of isopropanol. Following the completion of dropwise addition, 200 g of acrylic polymer solution C, 0.1 g of sodium formate as the condensation catalyst, 10 g of acetic acid, and 1 g of polyether-modified silicone as the leveling agent were added to the resulting solution. This material was then stirred to effect mixture, yielding a protective coating fluid C-1 having an active ingredient content of 31%.

Synthesis Example 4

Following the same procedure as in Synthesis Example 3, a mixture of γ-methacryloxypropyltrimethoxysilane (24.8 g, 0.20 mol), methyl methacrylate (160 g, 1.60 mol), 2-(2'-hydroxy-5'-methacryloxyethylphenyl)-2H-benzotriazole (64.6 g, 0.20 mol) and azobisisobutyronitrile (2 g) was added dropwise to 370 g of a solvent mixture to form a solution D containing an acrylic polymer having a number-average molecular weight of 103,000.

γ-Aminoethylaminopropyltrimethoxysilane (1.00 mol) and γ-glycidoxypropyldimethoxysilane (2.00 mol) were subjected to a ring-opening reaction in the presence of hexamethyldisilazane (3.0 mol), following which the product was reacted with acetic anhydride (2.00 mol). Next, 10 g of a methyl isobutyl ketone solution containing of the final reaction product in a concentration of 20% was added to 100 g of solution D, thereby giving a protective coating fluid D-1.

Synthesis Example 5

A propylene glycol monomethyl ether acetate solution E containing 30% of poly(methyl methacrylate) resin having a number-average molecular weight of 200,000 was prepared. 2,4-Dihydroxybenzophenone (3 g) and diacetone alcohol (150 g) were added to 100 g of solution E and stirred to effect dissolution, thereby giving a protective coating fluid E-1.

Synthesis Example 6

A two-liter flask equipped with a stirrer, a condenser and a thermometer was charged with γ-glycidoxypropyltrimethoxysilane (236.3 g, 1.00 mol), γ-glycidoxypropyldiethoxysilane (74.5 g, 0.30 mol) and 700 g of a methanol-dispersed sol having an active ingredient ($TiO_2/ZrO_2/SiO_2$ weight ratio=85/3/12; primary particle size, 20 nm) content of 30%. While stirring the flask contents at room temperature, 70 g of 0.1 N acetic acid in water was added dropwise over a period of one hour. Stirring was then continued at room temperature for another five hours, bringing hydrolysis to completion. Diacetone alcohol (150 g), aluminum acetylacetonate (2 g) as the condensation catalyst and polyether-modified silicone (2 g) as the leveling agent were added to the reaction mixture, following which the flask contents were stirred for another 30 minutes, yielding a silicone solution F containing a high refractive index sol. Ethanol (600 g) was added to 100 g of solution F, thereby giving a high refractive index layer-forming coating fluid F-1.

Synthesis Example 7

A methanol-dispersed sol having an active ingredient ($TiO_2/ZrO_2/SiO_2$ weight ratio=85/3/12; primary particle size, 20 nm) content of 30% (80 g), trimethylolpropane triacrylate (10 g), aluminum acetylacetonate as the condensation catalyst (1 g), polyether-modified silicone as the leveling agent (1 g), and 2-hydroxy-2-methyl-1-phenylpropan-1-one as the photoreaction initiator (1 g) were added to 100 g of silicone solution A, and the mixture was stirred at room temperature, giving a high refractive index sol-containing silicone solution G. Ethanol (500 g) was added to 100 g of solution G, thereby preparing a high refractive index layer-forming coating fluid G-1.

Synthesis Example 8

A one-liter flask equipped with a stirrer, a condenser and a thermometer was charged with $C_8F_{17}C_2H_4Si(OCH_3)_3$ (56.8 g, 0.10 mol), $CF_3C_2H_4Si(OCH_3)_3$ (141.8 g, 0.65 mol), $Si(OC_2H_5)_4$ (52.1 g, 0.25 mol) and isobutanol (90 g), following which 60 g of 0.2 N acetic acid in water was added dropwise over 30 minutes under stirring at room temperature. Acetylacetonate (2 g) was subsequently charged and the flask contents were stirred at room temperature for 8 hours to bring hydrolysis and condensation to completion, yielding a solution H of a fluorinated silicone compound. Diacetone alcohol (30 g), ethanol (300 g) and polyether-modified silicone (0.1 g) were added to 20 g of solution H, thereby giving a low refractive index layer-forming coating H-1.

Synthesis Example 9

$C_8F_{17}C_2H_4Si(OCH_3)_3$ (28.4 g, 0.05 mol) was dissolved in methyl isobutyl ketone (160 g) within a 0.5 liter flask equipped with a stirrer, a condenser and a thermometer, following which 5 g of 1 N aqueous hydrochloric acid was slowly added dropwise to the solution under stirring at room temperature. The solution was additionally stirred for one hour to bring hydrolysis to completion. Next, γ-acryloxypropyltrimethoxysilane (11.7 g, 0.05 mol) and benzyltriethylammonium chloride (0.5 g) were added to the solution, the solution temperature was raised to 80° C. by heating, and the reaction was carried out in this state for two hours, giving a solution J of a fluorinated silicone compound. Diacetone alcohol (50 g), ethanol (450 g), 2-hydroxy-2-methyl-1-phenylpropan-l-one (1 g) and polyether-modified silicone (0.1 g) were added to 100 g of this solution J, thereby preparing a low refractive index layer-forming coating J-1.

Synthesis Example 10

A 0.5 liter flask equipped with a stirrer, a condenser and a thermometer was charged with ion-exchanged water (230 g) and 35% hydrochloric acid (0.2 g). Next, while stirring the flask contents at room temperature, $C_8F_{17}C_2H_4SiCH_3(OH)_2$ (26.2 g, 0.05 mol) prepared by the hydrolysis of $C_8F_{17}C_2H_4SiCH_3(OCH_3)_2$, γ-acryloxypropyltrimethoxysilane (11.7 g, 0.05 mol), tetramethoxysilane (10.4 g, 0.05 mol), methyl isobutyl ketone (200 g) and dibutoxy(bis-2,4-pentadionato)titanium (0.5 g) were charged. The temperature of the flask contents was raised to 80° C. by heating, and the reaction was carried out in this state for 2 hours, giving a solution K of a fluorinated silicone compound. $CH_2=CHCOOC_2H_4C_8F_{17}$ (10 g), diacetone alcohol (50 g), ethanol (450 g), 2-hydroxy-2-methyl-1-phenylpropan-1-one (1 g) and polyether-modified silicone (0.1 g) were added to 100 g of this solution K, thereby preparing a low refractive index layer-forming coating K-1.

Synthesis Example 11

Aside from using 700 g of a methanol-dispersed silica sol having an active ingredient content of 30% instead of 700 g of the $TiO_2$-based methanol-dispersed sol used in Synthesis Example 6, a silica sol-containing silicone solution L was prepared in the same manner as in Synthesis Example 6. This solution was used directly, without ethanol dilution, as protective coating fluid L-1.

Comparative Synthesis Example 1

Aside from changing the amount of $TiO_2$-based methanol-dispersed sol from 700 g to 70 g, a high refractive index sol-containing silicone solution M was prepared in the same manner as in Synthesis Example 6. Ethanol (600 g) was added to 100 g of this solution M, giving a high refractive index layer-forming coating M-1.

Comparative Synthesis Example 2

Synthesis was carried out in the same way as in Synthesis Example 8, except that the silane compounds charged in Synthesis Example 8 were replaced with $C_8H_{17}C_2H_4Si(OCH_3)_3$ (11.4 g, 0.02 mol), $CF_3C_2H_4Si(OCH_3)_3)_3$ (93.8 g, 0.43 mol), $Si(OC_2H_5)_4$ (52.1 g, 0.25 mol) and $CH_3Si(OCH_3)_3$ (40.8 g, 0.30 mol), thereby preparing a fluorinated silicone compound solution N. This was similarly diluted to give a low refractive index layer-forming coating N-1.

The following methods were used to measure or evaluate various physical properties in the examples and comparative examples described below.

Mar Resistance Test:

Carried out in accordance with ASTM D1044 by mounting an abrading wheel (CS 10F) on a Taber abrader, subjecting the test piece to 50 cycles of abrasion under a load of 200 g, then measuring the haze. The Taber abrasion value (mar resistance) was expressed as the ratio (haze after test)/(haze before test), in percent.

Adhesion of Cured Film:

Measured in accordance with JIS K5400. Using a razor blade, the sample was scored with 11 lines each in the vertical and horizontal directions at 1 mm intervals, thereby forming a grid of 100 boxes. A commercial cellophane tape was bonded securely to the scored sample, then peeled off rapidly inward at an angle of 90 degrees. The score was obtained by dividing the number of intact boxes (X) by 100 (X/100).

Transparency:

The transparency was rated as "good" when the entire surface of the film was of uniform clarity, and was rated as "poor" when areas of diminished clarity existed.

Refractive Index:

A film having a thickness of 30 to 50 μm was fabricated, and the refractive index of the film was measured with an Abbe refractometer at a temperature of 20° C.

Antireflective Properties:

The antireflective properties were rated visually with the unaided eye as "good" or "poor".

Reflectance:

The reflectance of a test piece blackened on the reverse side was measured with a spectrophotometer.

[Coating Method]

The substrate used was either a 0.5 mm thick transparent polycarbonate resin sheet measuring 10×10 cm, or a 50 μm thick polyethylene terephthalate film measuring 10×10 cm.

A transparent resin sheet or film whose surface had been cleaned was coated to a predetermined thickness using either a bar coater or by dipping.

| | |
|---|---|
| Protective layer: | 3 to 5 μm thick cured film |
| High refractive index layer: | 0.1 to 0.3 μm thick cured film |
| Low refractive index layer: | 0.1 to 0.3 μm thick cured film |

(1) When Heat Cured:

The solution was applied, following which the sample was air dried to evaporate off the solvent, then held in a hot air circulation oven at 80 to 120° C. for 5 to 30 minutes to effect curing.

(2) When Ultraviolet Cured:

The sample was exposed three times to a dose of 200 mJ/cm$^2$ with a high-pressure mercury vapor lamp. Each successive layer was laminated by first curing the underlying layer, then applying and curing the composition formulated for the present layer.

Example 1

Protective layer-forming coating A-1, high refractive index layer-forming coating F-1, and low refractive index layer-forming coating H-1 were each successively applied onto a polycarbonate sheet in such a way as to achieve a certain, desired thickness.

This multilayer laminate had the following film properties.

(a) Mar resistance: No surface scratches were evident and a good Taber abrasion value of 5% was obtained, indicating excellent mar resistance.
(b) Adhesion: Adhesion was excellent (100/100).
(c) Transparency: Good transparency was maintained demonstrating excellent antireflective properties. The results obtained in direct visual tests also demonstrated that the laminate had good antireflective properties.

Examples 2 to 8, Comparative Examples 1 and 2

These examples were carried out using various materials as the protective layer, high refractive index layer and low refractive index layer-forming coatings. The results are shown in Table 1.

Example 9

The coating used to form the protective layer in Example 1 was diluted ten-fold with diacetone alcohol to form a lower concentration coating A-2, which was applied in the same manner as in Example 1. The resulting cured protective layer had a thickness of 0.3 μm. Aside from this, a multilayer laminate was formed in the same way as in Example 1. The measured properties are shown in Table 1.

The refractive indices of the high refractive index layers and low refractive index layers formed from the respective coating agents in the above examples are given below.

G-1: 1.68
M-1: 1.59
J-1: 1.39
K-1: 1.41
N-1: 1.46

TABLE 1

(Substrate: PC resin sheet)

| | Protective layer | High refractive index layer | Low refractive index layer | Surface appearance | Mar resistance (%) | Adhesion (out of 100) | Transparency | Anti-reflective properties | Reflectance (%) |
|---|---|---|---|---|---|---|---|---|---|
| EX 1 | A-1 | F-1 | H-1 | good | 5 | 100 | good | good | 1.3 |
| EX 2 | B-1 | F-1 | H-1 | good | 6 | 100 | good | good | 1.4 |
| EX 3 | C-1 | F-1 | H-1 | good | 7 | 100 | good | good | 1.4 |
| EX 4 | D-1 | F-1 | H-1 | good | 6 | 100 | good | good | 1.4 |
| EX 5 | E-1 | F-1 | H-1 | good | 6 | 100 | good | good | 1.4 |
| EX 6 | A-1 | G-1 | H-1 | good | 7 | 100 | good | good | 1.3 |
| EX 7 | A-1 | F-1 | J-1 | good | 7 | 100 | good | good | 1.4 |
| EX 8 | A-1 | F-1 | K-1 | good | 8 | 100 | good | good | 1.4 |
| EX 9 | A-2 | F-1 | H-1 | good | 12 | 90 | good | good | 1.4 |
| CE 1 | A-1 | M-1 | H-1 | good | 12 | 100 | good | poor | 2.0 |
| CE 2 | A-1 | F-1 | N-1 | good | 11 | 100 | good | poor | 1.9 |

(d) Refractive index:
High refractive index layer (F-1)=1.70
Low refractive index layer (H-1)=1.38
(e) Reflectance: A good reflectance of 1.3% was obtained at a wavelength of 550 nm. Results were substantially uniform over the wavelength range of 400 to 800 nm, Examples 10 to 18, Comparatives Examples 4 and 5

The substrate was changed to a polyethylene terephthalate film, and the same tests were carried out as described above. The results are shown in Table 2.

TABLE 2

(Substrate: PET film)

| | Protective layer | High refractive index layer | Low refractive index layer | Surface appearance | Mar resistance (%) | Adhesion (out of 100) | Transparency | Anti-reflective properties | Reflectance (%) |
|---|---|---|---|---|---|---|---|---|---|
| EX 10 | A-1 | F-1 | H-1 | good | 6 | 100 | good | good | 1.3 |
| EX 11 | B-1 | F-1 | H-1 | good | 7 | 100 | good | good | 1.4 |
| EX 12 | C-1 | F-1 | H-1 | good | 7 | 100 | good | good | 1.4 |
| EX 13 | D-1 | F-1 | H-1 | good | 6 | 100 | good | good | 1.4 |
| EX 14 | E-1 | F-1 | H-1 | good | 7 | 100 | good | good | 1.3 |
| EX 15 | A-1 | G-1 | H-1 | good | 8 | 100 | good | good | 1.4 |
| EX 16 | A-1 | F-1 | J-1 | good | 7 | 100 | good | good | 1.4 |
| EX 17 | A-1 | F-1 | K-1 | good | 8 | 100 | good | good | 1.3 |
| EX 18 | A-2 | F-1 | H-1 | good | 14 | 80 | good | good | 1.4 |
| CE 4 | A-1 | M-1 | H-1 | good | 13 | 100 | good | poor | 2.2 |
| CE 5 | A-1 | F-1 | N-1 | good | 11 | 100 | good | poor | 2.0 |

As demonstrated above, the multilayer laminates of the invention, by being composed of a specific protective layer, a specific high refractive index layer and a specific low refractive index layer which have been formed to a predetermined thickness by the successive lamination of the respective above-described compositions onto a transparent substrate made of a suitable material such as glass, ceramic or plastic, provide on the surface of the substrate a cured film having excellent adhesion to the substrate and also outstanding mar resistance and antireflective properties. Such attributes make the inventive laminates well suited for use in various types of displays, liquid crystal-related materials, and optical applications such as lenses. A water- and oil-repelling layer may be provided as the outermost layer to confer the multilayer laminate with stain-proofing properties that prevent, for instance, fingerprints from being left on the surface. Moreover, a pressure-sensitive adhesive layer may be provided on the back side of the sheet substrate to adapt the inventive laminate for use in applications requiring attachment to another substrate.

Japanese Patent Application No. 2001-215292 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. An antireflective, mar-resistant multilayer laminate which comprises a transparent substrate and, successively laminated thereon:

(1) a protective layer composed of a hydrolyzable silyl group-bearing acrylic polymer-containing composition in cured form, the hydrolyzable silyl group-bearing acrylic polymer-containing composition comprising:

(i) an acrylic polymer having pendant or terminal hydrolyzable silyl groups, and (ii) a hydrolyzable organosilicon compound of general formula (3) below in hydrolyzed and partially condensed form $$R_m SiR''_n X_{4-m-n} \quad (3)$$

wherein R is a (meth)acryl functional substituent-bearing $C_{3-10}$ organic group or a (meth)acryl functional substituent-lacking $C_{1-8}$ organic group, R'' is a $C_{1-6}$ monovalent hydrocarbon group and X is a hydrolyzable group; and the letters m and n are integers from 0 to 3 such that the sum m+n is 0 to 3;

(2) a high refractive index layer which contains a metal oxide sol and has a refractive index of at least 1.60; and (3) a low refractive index layer having a refractive index of at most 1.45 which is prepared by curing a fluorinated organic group-bearing silicone resin-containing composition.

2. An antireflective, mar-resistant multilayer laminate which comprises a transparent substrate and, successively laminated thereon:

(1) a protective layer composed of a (meth)acryl functional substituent-bearing compound, a curable composition in cured form which contains the compound, or a thermoplastic acrylic resin;

(2) a high refractive index layer which contains a metal oxide sol and has a refractive index of at least 1.60; and (3) a low refractive index layer having a refractive index of at most 1.45 which is prepared by curing a fluorinated organic group-bearing silicone resin-containing composition, the fluorinated organic group-bearing silicone resin being prepared by hydrolyzing:

(iii) a fluorinated organosilicon compound of general formula (4) below $$Rf\text{—}SiR''_b X_{3-b} \quad (4)$$

(iv) an organosilicon compound of general formula (5) below $$CF_3CH_2CH_2\text{—}SiR''_c X_{3-c} \quad (5), \text{ and}$$

(v) an organosilicon compound of general formula (6) below $$SiX_4 \quad (6)$$

wherein Rf is a fluorinated $C_{4-20}$ organic group, R'' is a $C_{1-6}$ monovalent hydrocarbon group, X is a hydrolyzable group, b is an integer from 0 to 2 and c is an integer from 0 to 2.

3. An antireflective, mar-resistant multilayer laminate which comprises a transparent substrate and, successively laminated thereon:-

(1) a protective layer composed of a (meth)acryl functional substituent-bearing compound, a curable composition in cured form which contains the compound, or a thermoplastic acrylic resin;

(2) a high refractive index layer which contains a metal oxide sol and has a refractive index of at least 1.60; and (3) a low refractive index layer having a refractive index of at most 1.45 which is prepared by curing a fluorinated organic group-bearing silicone resin-containing composition, the fluorinated organic group-bearing silicone resin is a (meth)acryl functional group-bearing silicone resin obtained by hydrolyzing silane compounds comprising:

(vi) a fluorinated organosilicon compound of general formula (7) below $$Rf\text{—}SiR''_bY_{3-b} \qquad (7),\text{ and}$$

(vii) a (meth)acryl functional group-bearing organosilicon compound of general formula (1) below $$A\text{-}SiR''_aX_{3-a} \qquad (1),$$

wherein Rf is a fluorinated $C_{4-20}$ organic group, R" is a $C_{1-6}$ monovalent hydrocarbon group, Y is a hydrolyzable group or a hydroxyl group, A is a (meth)acryl functional substituent-bearing $C_{3-10}$ organic group, X is a hydrolyzable group, b is an integer from 0 to 2 and a is an integer from 0 to 2.

4. The multilayer laminate of claim 1, wherein the protective layer is a cured layer obtained by subjecting a radiation polymerizable composition to radiation polymerization.

5. The multilayer laminate of claim 4 wherein the radiation polymerizable composition contains a (meth)acryl functional group-bearing organosilicon compound prepared by hydrolyzing:

(vii) (meth)acryl functional group-bearing organosilicon compound of general formula (1) below $$A\text{-}SiR''_aX_{3-a} \qquad (1),\text{ and}$$

(viii) a hydrolyzable organosilicon compound of general formula (2) below $$R'_pSiR''_qX_{4-p-q} \qquad (2)$$

wherein A is a (meth)acryl functional substituent-bearing $C_{3-10}$ organic group, R" is a $C_{1-6}$ monovalent hydrocarbon group, X is a hydrolyzable group, and the letter a is an integer from 0 to 2, R' is a (meth)acryl functional substituent-lacking $C_{1-8}$ organic group, and p and q are integers from 0 to 3 such that the sum p+q is 0 to 3.

6. The multilayer laminate of claim 1, wherein the protective layer is composed of a thermoplastic acrylic resin.

7. The multilayer laminate of claim 1, wherein the protective layer has a thickness of at least 1 μm.

8. The multilayer laminate of claim 1, wherein the metal oxide sol contains at least titanium atoms.

9. The multilayer laminate of claim 1, wherein the high refractive index layer has a refractive index of at least 1.64.

10. The multilayer laminate of claim 1, wherein the low refractive index layer has a refractive index of at most 1.43.

11. The multilayer laminate of claim 1, wherein the transparent substrate is made of polycarbonate resin, polyalkylene terephthalate resin, or cellulose triacetate resin.

12. The multilayer laminate of claim 1 having, on the transparent substrate side thereof, a layer of pressure-sensitive adhesive or non-pressure-sensitive adhesive, and additionally having a release film laminated over the layer of adhesive.

13. The multilayer laminate of claim 1, wherein the transparent substrate is a film.

* * * * *